Sept. 20, 1927.

A. A. DEBROCQ 1,643,152

APPARATUS FOR DRAWING GLASS

Filed Sept. 9, 1926   2 Sheets-Sheet 1

Inventor
A. A. Debrocq

By Mawhinney & Mawhinney
Attorneys

Sept. 20, 1927.

A. A. DEBROCQ 1,643,152

APPARATUS FOR DRAWING GLASS

Filed Sept. 9, 1926

Inventor
A. A. DeBrocq.

By Mawhinney & Mawhinney
Attorneys

Patented Sept. 20, 1927.

1,643,152

UNITED STATES PATENT OFFICE.

ADHEMAR A. DEBROCQ, OF FAIRCHANCE, PENNSYLVANIA.

APPARATUS FOR DRAWING GLASS.

Application filed September 9, 1926. Serial No. 134,453.

The present invention relates to improvements in apparatus for drawing glass and consists in certain improvements in existing apparatus according to what is known as the "Fourcault" process.

Frequently the edges or border portions of the drawn glass sheet break and the falling pieces of glass strike the Fourcault supplying float, denting or otherwise impairing the lips or edge portions of the slot through which the border portions of the sheet are drawn. The good quality of the drawn glass in this particular process is dependent upon the good condition of the slot in the float. Impaired slot walls will produce bad or defective edges in the drawn sheet. Such defects consist in abnormally thick and non-uniform edges, or edges or border portions full of lines or similar blemishes. In attempting to cut this glass away, more breakage will result with further delay and losses in the drawing process.

The present invention aims to remove the above difficulties and to this end provision is made for catching the broken pieces of falling glass and preventing such falling glass from gaining access to the float.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a vertical section taken through an apparatus constructed according to the present invention.

Figure 3:
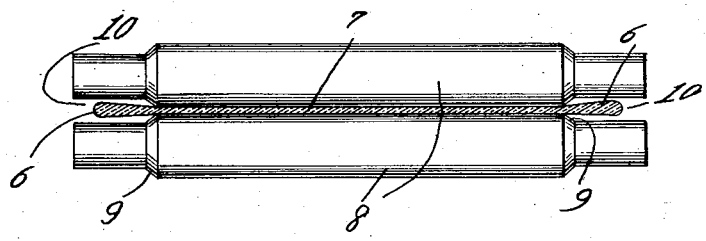
Figure 3 is a top plan view of the drawing rollers with the glass sheet indicated as in section.

In drawing sheet glass by the Fourcault process, the edges of the sheet are slightly beaded, as indicated at 6 in Figure 3; that is the edges are slightly thicker than the intermediate portion of the sheet indicated at 7. For this reason the rolls 8, which are used for drawing the sheet are tapered or cut away, at their ends 9 thus leaving a space 10 through which the beaded edge portions 6 of the sheet upwardly pass out of contact with the rolls. Broken glass falling from the edge portions is thus enabled to fall between the rolls through the space 10 and thus to strike the walls of the supplying float 11, which is placed in the glass bath 12 in the furnace 13 below.

Figure 4:
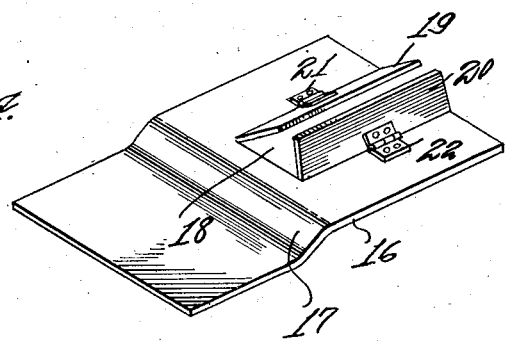
Figure 4 is a perspective view of a detail taken on an enlarged scale.

According to the invention the device, shown in Figure 4 is placed upon the furnace roof 14 adjoining the opening 15 through which the glass sheet 7 passes from the float 11 to the drawing rolls 8.

This device consists of the base plate 16 made of metal or other suitable material and this plate is curved or bent at 17, if desired, to fit the special construction of furnace.

Figure 2:
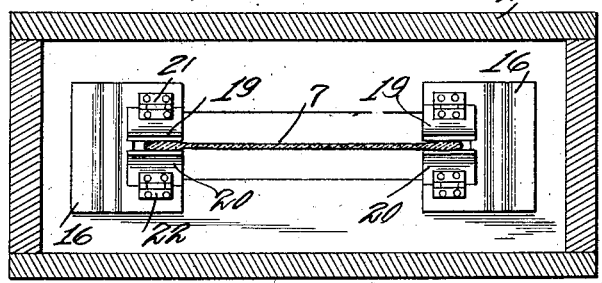
Figure 2 is a horizontal section taken on the line 2—2 in Figure 1.

The plate is provided with a slot 18 opening through its inner edge and flaps or strips 19 and 20 are hinged or otherwise secured to opposite walls of the slot 18, as indicated at 21 and 22. The open slot 18 receives the drawn border portions of the sheet and the side walls of the slot 18 are spaced from the sides of the sheet. The flaps 19 and 20 are loosely hinged to the plate and these flaps extend upwardly in angular relation to the plane of the plate 16 and they bear at their upper near edges upon opposite sides of the border portions of the sheet 7, as shown in Figure 2. It is clear that the flaps, which are arranged at the border portions of the sheet will catch any falling glass from above. Such falling glass will strike the inclined flaps 19 and 20 and be deflected aside by them. The float 11 is thus protected from injury by falling glass from the edges of the sheet during drawing. These flaps engage the border portions of the sheet at a point above the bath where the glass is set, and preferably beneath or between the drawing rolls. These flaps are wide enough and long enough to extend beyond the border portions of the sheet in an outward direction and beyond a line projected downwardly from the beveled portions 9 of the drawing rolls 8 in an inward direction. The flaps thus afford full protection against falling glass at the edges. Since they contact with the hot set glass, these flaps are preferably made of asbestos or like material which will not check or crack the glass.

Figure 1:
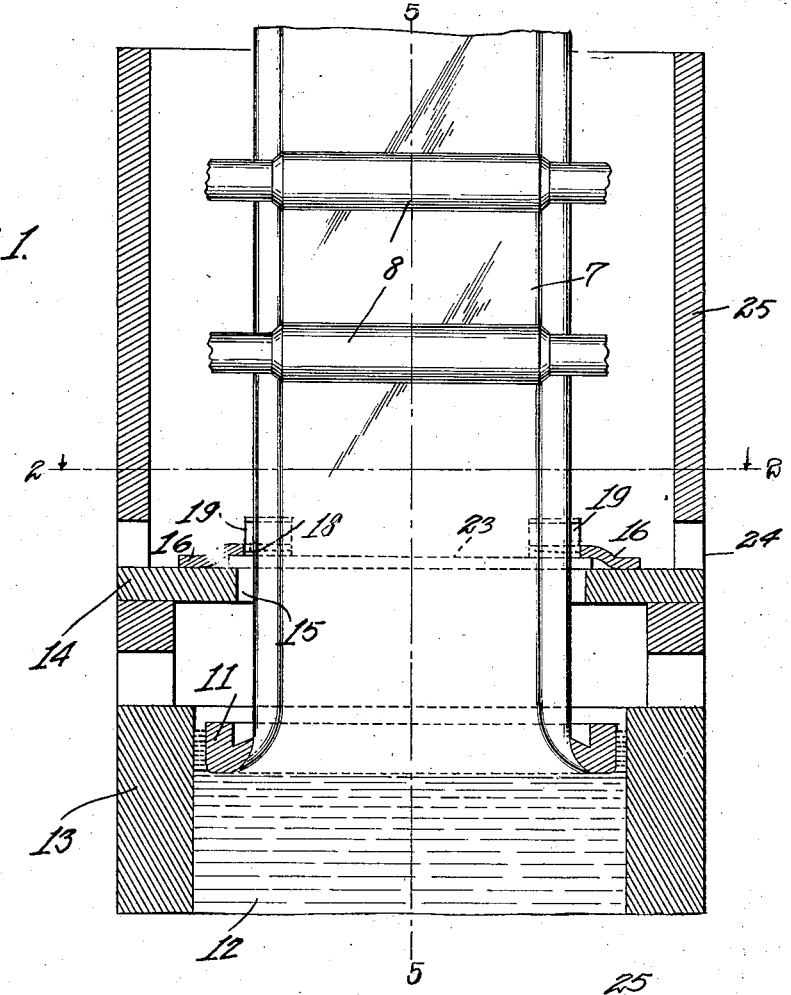
Figure 5:
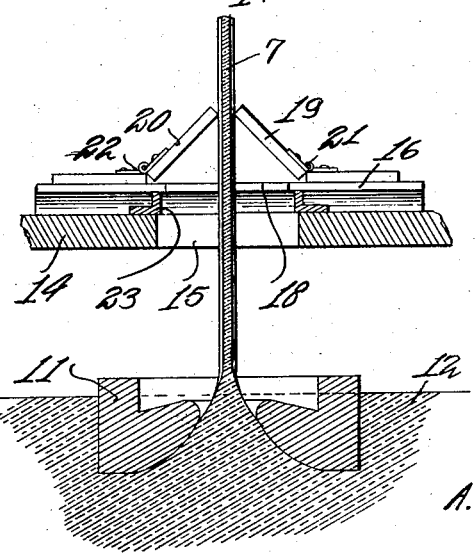
Figure 5 is a vertical section taken on the line 5—5 in Figure 1.

At 23 in Figures 1 and 5 are indicated angle irons on top of the furnace roof 14 adjacent the opening 15. The outer portions of the plates 16 rest upon or are fixed to the furnace roof 14, while the upwardly curved inner portions of such plates extend over and may rest upon the end portions of the angle irons 23. The devices may be introduced and withdrawn through the doors or openings 24 above the furnace roof in the vertical leer casing 25.

It is obvious that various changes and modifications may be made in the details of construction and design of the above specifically described embodiment of this invention without departing from the spirit thereof, such changes and modifications being restricted only by the scope of the following claims.

What is claimed is:—

1. In a glass drawing apparatus, a holder for a bath of glass, a supplying float in the bath up through which the glass sheet is drawn, means for drawing the glass sheet upwardly, and flaps wholly below said drawing means and above the float and lying at the edge portions only of the sheet for intercepting falling glass.

2. In a glass drawing apparatus, a holder for a bath of glass, a supplying float in the bath up through which the glass sheet is drawn, means for drawing the glass sheet upwardly, and upwardly convergent pivoted flaps at the border portions of the sheet only interposed between said drawing means and the float and wholly below said drawing means for catching the diverting falling glass from the float.

3. In a glass drawing apparatus, a holder for a bath of glass, a supplying float in the bath up through which the glass sheet is drawn, means for drawing the glass sheet upwardly, slotted plates at the border portions of the drawn sheet between said float and drawing means, and flaps pivoted to said plates and bearing at their free edges against the side portions of the sheet.

4. In an apparatus for drawing glass, a holder for a bath of glass, a float therein having a slot through which the glass sheet is upwardly drawn, drawing rolls engaging the glass sheet having cut away end portions at the borders of the sheet, plates having slots for freely enveloping the border portions of the glass sheet between such rolls and the float, and pivoted flaps or refractory material extending upwardly in convergent relation, said flaps being pivoted at the sides of the slots on said plates and overlapping the side edges of the glass and sheet and the space directly below the cut away ends of said drawing rollers whereby to catch the falling glass and prevent the same from striking the float.

5. In a glass drawing apparatus, a holder for a bath of glass, a supplying float in the bath up through which the glass sheet is drawn, means for drawing the glass sheet upwardly, and flaps in contact with the sides of the border portions only of the sheet for intercepting falling glass.

6. Means for drawing a sheet of glass from a bath of molten glass including rolls having their end portions out of contact with the border portion of the sheet, and flap members positioned below the rolls so as to contact with opposite sides of the sheet border portions only.

In testimony whereof I affix my signature.

ADHEMAR A. DEBROCQ.